Oct. 25, 1938.　　　C. J. COBERLY　　　2,134,174
VALVE FOR FLUID-OPERATED MOTORS
Filed April 21, 1937　　　4 Sheets-Sheet 1

INVENTOR
CLARENCE J. COBERLY
BY HARRIS, KIECH, FOSTER & HARRIS
ATTORNEYS.

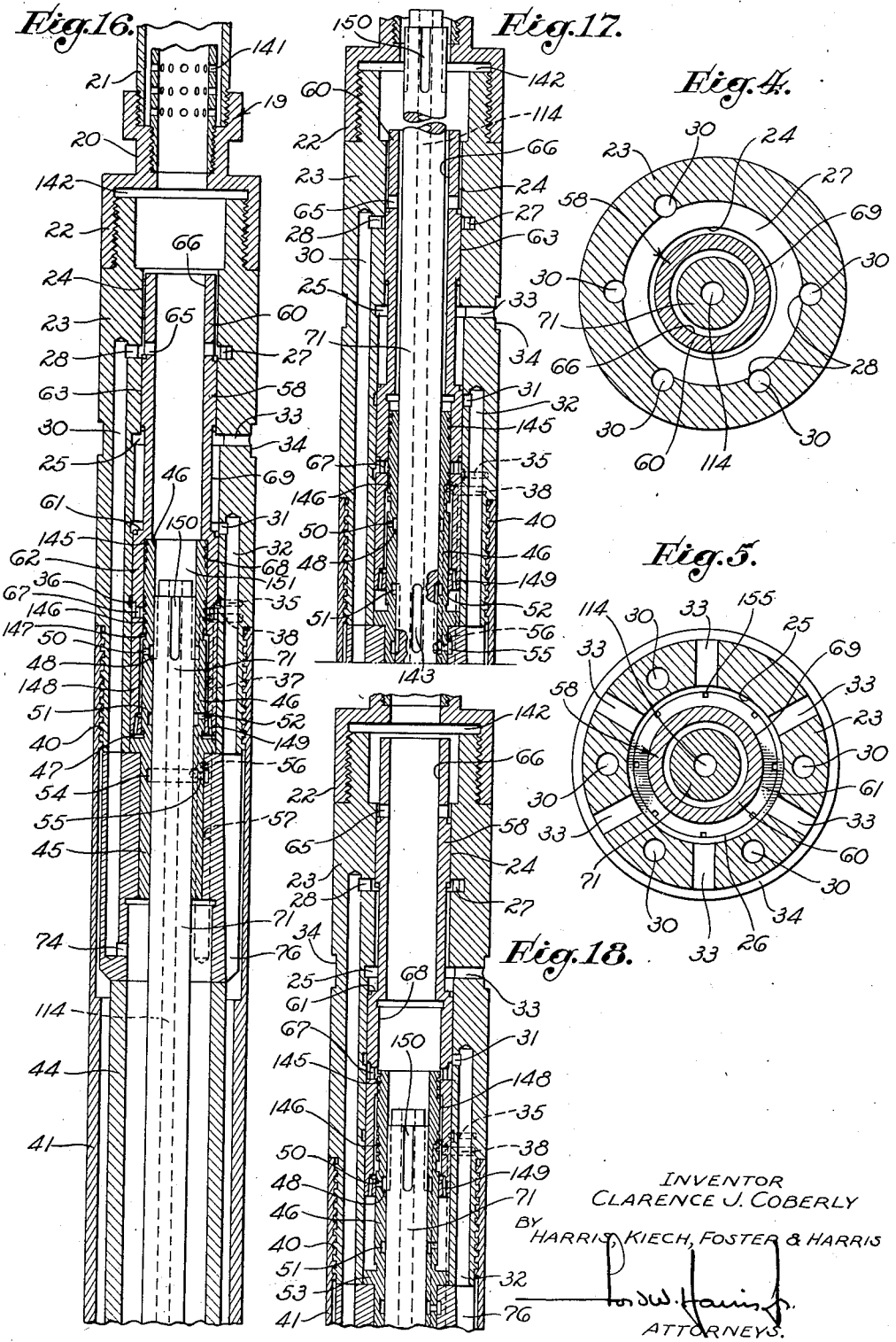

Oct. 25, 1938.                    C. J. COBERLY                    2,134,174
                       VALVE FOR FLUID-OPERATED MOTORS
                          Filed April 21, 1937          4 Sheets-Sheet 3
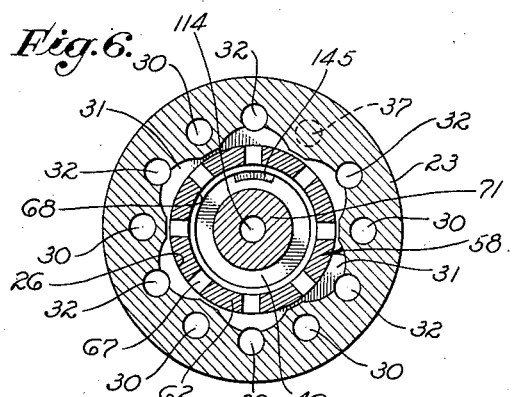
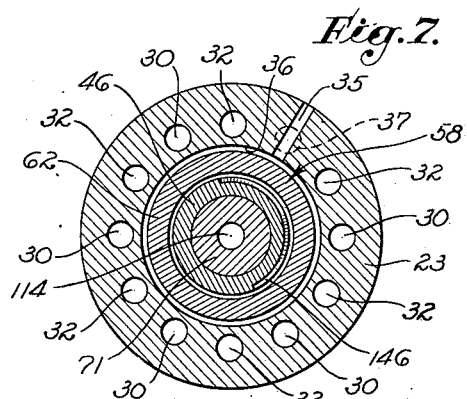
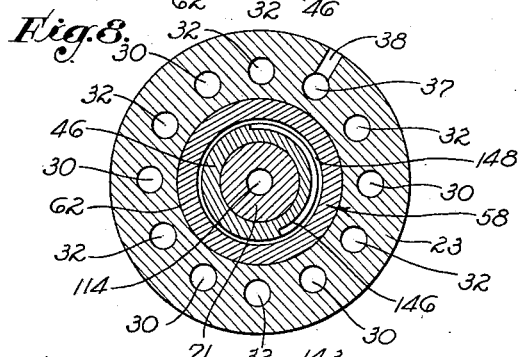
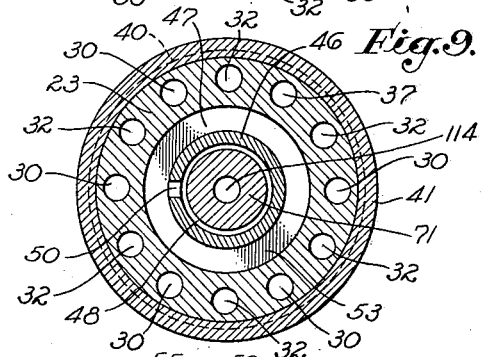
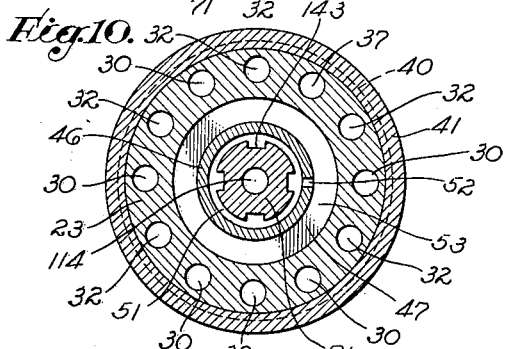
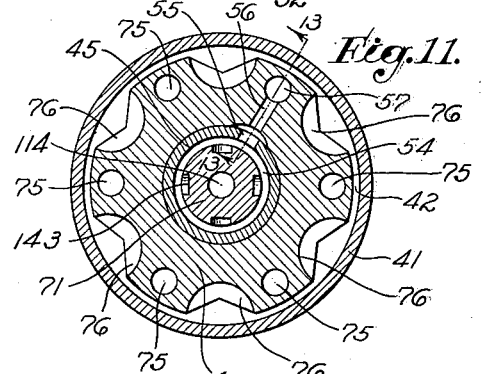
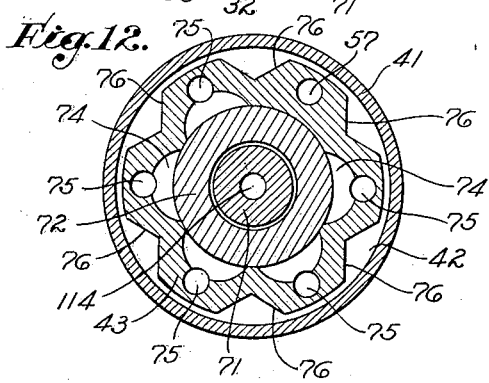
INVENTOR
CLARENCE J. COBERLY
BY HARRIS, KIECH, FOSTER & HARRIS
ATTORNEYS.

Oct. 25, 1938.                C. J. COBERLY                    2,134,174
                    VALVE FOR FLUID-OPERATED MOTORS
                      Filed April 21, 1937          4 Sheets-Sheet 4
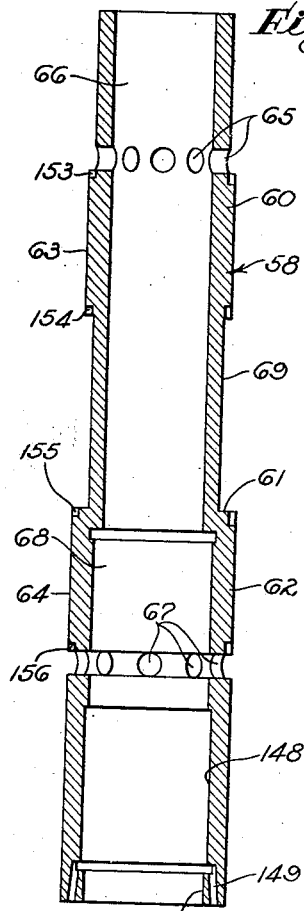
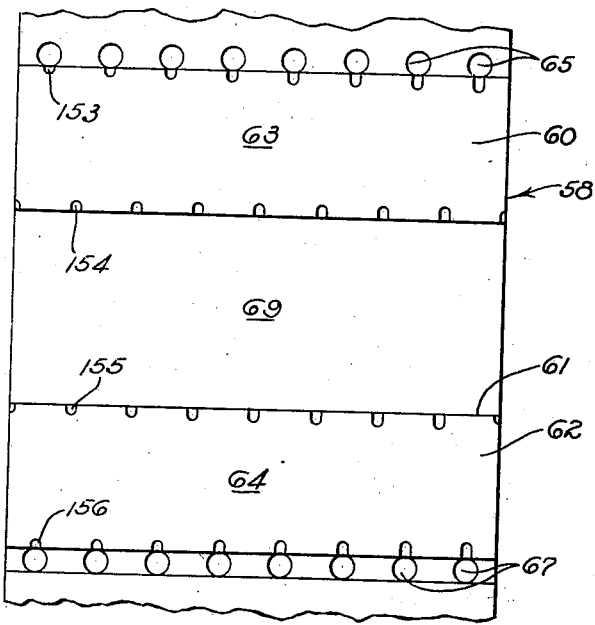
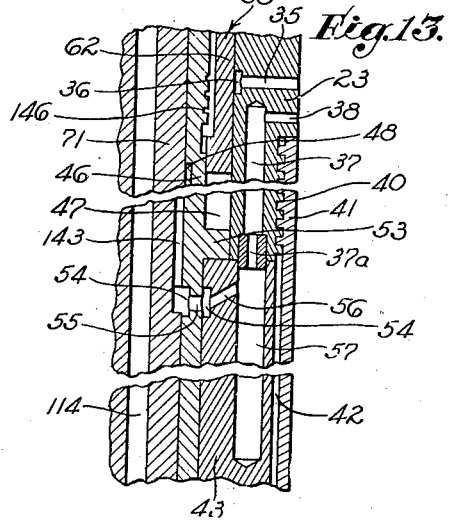
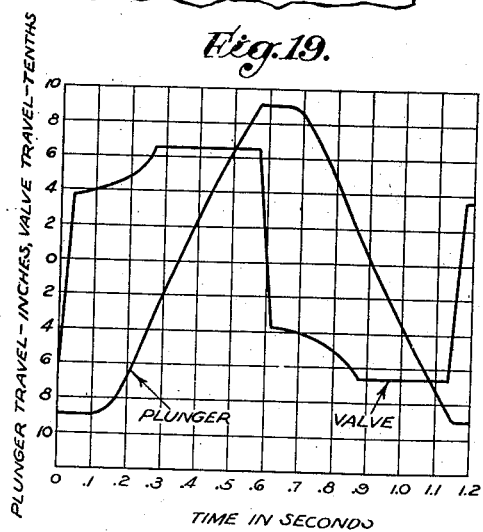
INVENTOR
CLARENCE J. COBERLY
BY HARRIS, KIECH, FOSTER & HARRIS
ATTORNEYS.

Patented Oct. 25, 1938

2,134,174

UNITED STATES PATENT OFFICE 2,134,174

VALVE FOR FLUID-OPERATED MOTORS

Clarence J. Coberly, Los Angeles, Calif., assignor to Roko Corporation, Reno, Nev., a corporation of Nevada Application April 21, 1937, Serial No. 138,176

9 Claims. (Cl. 121—151)

This application is a continuation-in-part of my copending Patent No. 2,081,223, issued May 25, 1937, for "Fluid operated deep well pump", and a continuation-in-part of my pending application Serial No. 720,057, filed April 11, 1934, for "Liquid operated motor".

The present invention relates to a valve structure for a fluid-operated motor, and is of especial utility in fluid motors for use with fluid-operated pumps disposed at the bottoms of deep wells for the purpose of pumping oil therefrom, and for this reason it is deemed advisable to disclose the invention in connection with such a pump. As is well known, the conditions encountered in drilling deep wells make it necessary to reduce the size of casings or liners as the well is continued downwardly. As a result, at the bottom of a deep well the pipe which enters the oil formation may often be of very small diameter, for instance, from two or three inches. The space limitations thus produced make the design of deep well pumps exceedingly difficult, especially with relation to that type of pump known as a "fluid-operated pump", in which the pumping piston and a motor therefor are combined in one small structure which is disposed within the casing at substantially the bottom of the well.

My invention contributes to the making of a pump of this character which will operate satisfactorily for relatively long periods of time and with high efficiency as compared with pumps known in the art at the present time.

It is an object of the invention to provide a valve for a fluid-operated pump mechanism, which controls the delivery of fluid under pressure to the motor cylinder of the pump, the valve being fluid operated and positive in its action.

A further object of the invention is to provide a valve mechanism having a sliding valve part which is moved between primary and secondary positions and controlled by fluid pressure, and which has means for holding the valve in such positions during periods when movement thereof is not intended.

It is an object of the invention to provide means for controlling the flow and application of fluids under pressure in the mechanism in such a manner that sudden shock of fluid pressure in the mechanism during operation thereof is avoided.

It is another object of the invention to provide a structure accomplishing the function set forth in the preceding paragraph which includes a sliding valve moving between primary and secondary positions to alternately open passages for supplying fluid under pressure to opposite ends of a power cylinder which in turn controls a pumping cylinder, the valve being controlled by a novel form of throttling means to move slowly during the initial opening of the passages, at which time oil is first admitted to the pump cylinder, and to accelerate during the completion of its movement to fully open the passages.

In the operation of the device, as will be explained hereinafter, the fluid pressures in the fluid passages and chambers gradually build up and recede, and the moving parts have controlled acceleration and deceleration. In such a manner, the structure of the pumping device is to the greatest possible extent relieved of the sudden application of forces and the shocks resulting therefrom.

It is another object to provide a valve mechanism which controls the rate of valve movement in each direction independently.

It is another object to provide a means to cause a valve to move rapidly for a given part of its travel, very slowly for a given part and then with increasing speed to the end of its travel, and independent means of obtaining similar action when the valve is moved in the opposite direction.

Another object is to provide a valve which will give a rapid cut off, a predetermined period between cut off and beginning of admission, slow initial admission with increasing speed, ending with a rapid final movement.

Further objects and features of the invention will be made clear in the following part of the specification taken in connection with the accompanying drawings.

In the drawings:

Fig. 4 is a slightly enlarged cross section on a plane represented by the line 4—4 of Fig. 1.

Fig. 5 is an enlarged cross-section on a plane represented by the line 5—5 of Fig. 1.

Fig. 6 is a cross-section on a plane represented by the line 6—6 of Fig. 1.

Fig. 7 is an enlarged cross-section on a plane represented by the line 7—7 of Fig. 1.

Fig. 8 is an enlarged cross-section on a plane represented by the line 8—8 of Fig. 1.

Fig. 9 is a cross-section on a plane represented by the line 9—9 of Fig. 1.

Fig. 10 is an enlarged cross-section on a plane represented by the line 10—10 of Fig. 1.

Fig. 11 is an enlarged cross-section on a plane represented by the line 11—11 of Fig. 1.

Fig. 12 is an enlarged cross-section on a plane represented by the line 12—12 of Fig. 1.

Fig. 13 is a fragmentary section on a vertical plane taken as indicated by the line 13 of Fig. 11.

Fig. 14 is an enlarged vertically sectioned view of the valve member forming a part of the invention, in connection with fragmentary portions of the valve body and valve liner of the structure are shown.

Fig. 15 is a view showing the surface of the valve member 14 projected onto a vertical plane for the purpose of showing grooves formed in the surface of the valve member.

Fig. 16 is a vertically sectioned view corresponding to Fig. 1, but showing the valve member and the pilot member of the structure in their respective lowered positions.

Fig. 17 is a fragmentary sectional view showing the valve member as it approaches lowered position.

Fig. 18 is a fragmentary sectional view similar to Fig. 17, showing the valve member as it approaches raised position.

Fig. 19 is a space-time diagram of the valve movement and piston movement of the pump in which the ordinates represent time in seconds and the abscissa represents the valve travel in tenths of an inch and the plunger travel in inches, the diagram clearly illustrating the relative movement of the valve and piston and also the rate of movement throughout one complete cycle.

Figure 1:
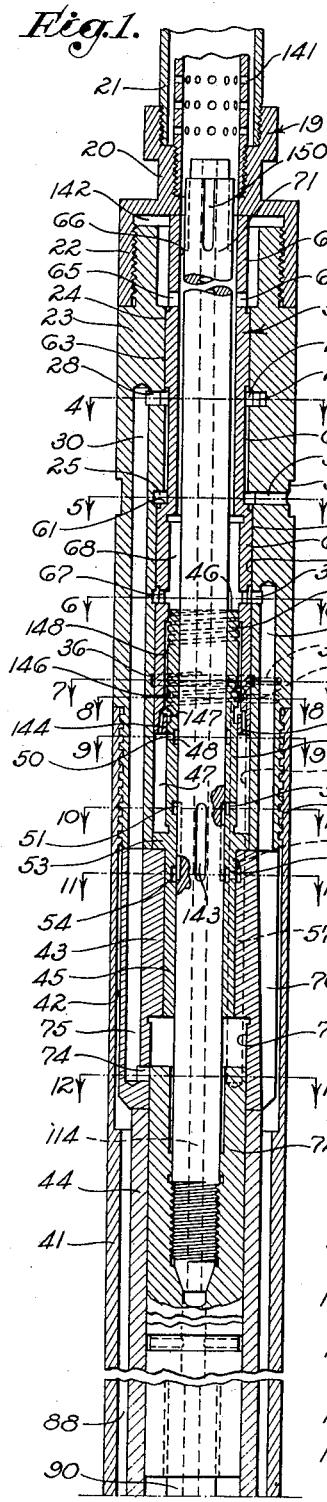
Fig. 1 is a vertically sectioned view showing the upper end of a fluid-operated pump embodying the features of my invention.
Figure 2:
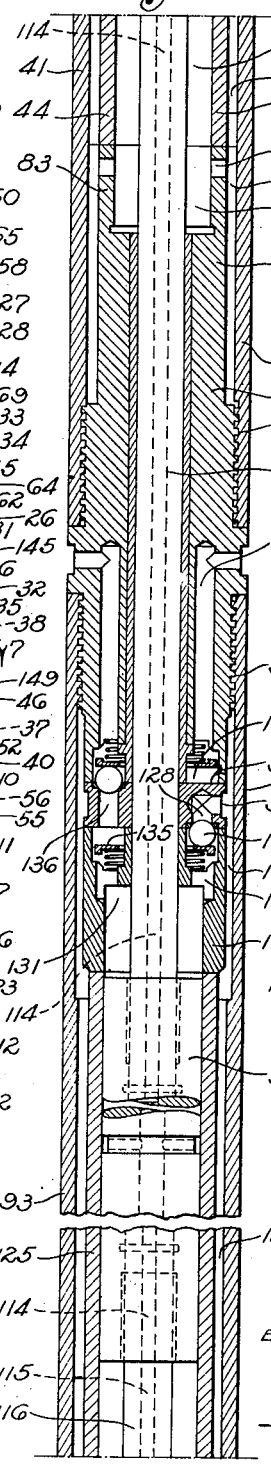
Fig. 2 is a vertically sectioned view complementary to Fig. 1 showing the central section of the pump.
Figure 3:
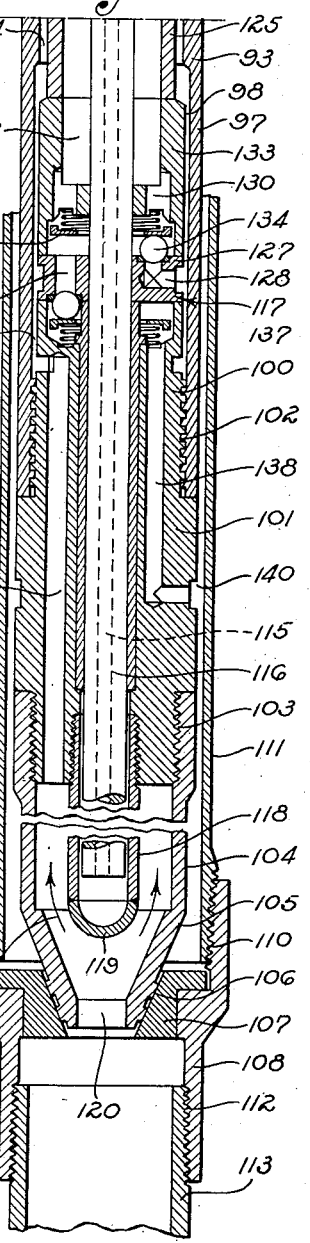
Fig. 3 is a vertically sectioned view complementary to Fig. 2 showing the lower end section of the pump.

In the pump structure 19, Figs. 1, 2, and 3, embodying my present invention, I employ an upper fitting 20 by which the pump structure is secured to the lower end of a fluid delivery pipe 21 by which operating fluid under relatively high pressure is delivered to the motor section of the pump structure 19. The fitting 20 has a threaded portion 22 for connection to the upper end of a valve body 23. The valve body 23 has an axial minor bore 24 formed in the upper part thereof, which minor bore 24 is separated by a circular channel 25 from a major bore 26 axially formed in the lower portion of the valve body 23.

Substantially intermediately between the ends of the minor bore 24 is a circular channel 27 which communicates through ports 28 with the upper ends of primary fluid passages 30 which extend within the wall of the valve body 23 to the lower end thereof. Spaced below the channel 25 in the major bore 26 is a plurality of secondary ports 31 communicating with the upper ends of secondary fluid passages 32 which are formed coaxially within the wall of the valve body 23 and are placed between the passages 30, as shown in Fig. 6, and which secondary passages 32 extend to the lower end of the valve body 23. As further shown in Fig. 6, the ports 31 constitute circular depressions formed in the inner face of the major bore 26, preferably by the use of circular milling cutters.

As shown in Fig. 5 and also in Fig. 1, a plurality of discharge ports 33 connect the channel 25 with a channel 34 formed in the outer face of the valve body 23. As shown in Figs. 1 and 7, an auxiliary discharge passage 35 connects between the exterior of the valve body 23 and a small channel 36 formed within the major bore 26 below the ports 31. As shown in Figs. 1, 8, and 13, a passage 37 extends upwardly from the lower end of the valve body 23 in a position between two of the passages 32, as shown by dotted lines in Figs. 6 and 7. The passage 37 accordingly is in the same vertical plane as the discharge passage 35 but stops below the passage 35. Connecting the upper end of the passage 37 with the exterior of the valve body 23 is a port 38.

To threads 40 formed at the lower end of the valve body 23, a power cylinder 41 is secured, this power cylinder having an axial chamber 42 formed in the upper end thereof for receiving a plug body 43 which is held in fluid-tight engagement with the lower end of the valve body 23 and in fluid-tight engagement with the upper end of a cylinder liner 44 when the power cylinder 41 is connected to the valve body 23 as shown. Mounted in the upper part of the plug 43 is a valve liner 45 having an upper end portion 46 extending upwardly within the major bore 26 of the valve body 23 to a plane disposed a short distance below the ports 31, there being an annular space 47 formed within the major bore 26 around the upper end portion 46 of the valve liner 45. Internally formed intermediate the ends of the upper portion 46 of the valve liner 45 is a channel 48 which communicates with the space 47 through a port 50, and near the lower end of the upper portion 46 is an annular channel 51 which communicates with the space 47 through a port 52. The channels 48 and 51, and the ports 50 and 52 are shown in the cross-sectional views, Figs. 9 and 10. A shoulder or collar 53 is formed on the valve liner 45 in a position to rest against the upper end of the plug body 43 and to reside within the lower extremity of the major bore 26. Below the horizontal plane of the collar 53, a channel 54 is formed, which, as shown in Figs. 1, 11, and 13, communicates through a port 55 in the wall of the valve liner 45 and a passage 56 in the plug body 43 with a vertical passage 57 which connects with the lower end of the passage 37 formed in the lower portion of the valve body 23, so as to communicate with the exterior of the pump structure through the port 38 disposed at the upper end of the passage 37 as shown in Figs. 8 and 13. To align the passage 37 with the passage 57 a means for preventing rotation of the plug body 43 and the valve body 23 is provided in the form of a small sleeve 37a which is pressed into a counterbore in the lower end of the passage 37 so as to project into the upper end of the passage 57, as shown in Fig. 13.

Slidable within the valve body 23 is a piston valve 58 which is of tubular form and has a minor portion 60 which is separated by a radial shoulder 61 from a major portion 62. The minor portion 60 of the valve member 58 is of smaller diameter than the major portion 62 and has an external surface 63 which fits the minor bore 24 of the valve body 23 in fluid-tight relation. The major portion 62 of the valve member 58 has an external surface 64 which is slidable within and fits the major bore 26 of the valve body 23 in fluid-tight relation. In the upper part of the minor portion 60 of the valve member 58 are primary valve ports 65 which connect the bore 66 of the minor portion 60 with the primary ports 28 at the upper ends of the primary passages 30 when the valve member 58 is in lowered or primary position, as shown in Fig. 16. In the major portion 62 of the valve member 58 are secondary valve ports 67 which connect the bore 68 of the major portion 62 with the secondary ports 31 at the upper ends of the secondary passages 32, when the valve member 58 is in raised or secondary position, as shown in Fig. 1. At the lower end of the minor portion 60 of the valve member 58 is a shallow channel 69 which extends circumferentially around the valve member and constitutes a port for connecting the primary passages 30 with the discharge passage or port 33, as shown in Fig. 1, when the valve member 58 is in raised position, and for connecting the secondary passages 32 with the discharge passage 33, as shown in Fig. 16, when the valve member 58 is in lowered position. Slidable within the bore of the valve liner 45 in fluid-tight relation, and movable within the bore of the valve member 58 in spaced relation thereto, between the raised and lowered positions thereof shown in Figs. 1 and 16, is a pilot rod 71, the lower end of which is connected to the upper end of a power piston 72 adapted to be reciprocated within the power cylinder 41. A cavity 73 formed in the lower end of the plug body 43 constitutes a continuation of the bore of the cylinder liner 44, and the portion thereof above ports 74 forms a dashpot chamber for holding a body of fluid to stop the upward movement of the power piston 72 with a cushioning effect. The ports 74 communicate with vertical passages 75 formed in the wall of the plug body 43 so as to connect with the lower ends of the primary fluid passages 30 of the valve body 23.

The secondary fluid passages 32, which lead downwardly from the ports 31, connect with fluid passages 76 having the form of grooves in the external face of the plug body 43. The lower end of the power cylinder 41 has threads 77 for connecting it to an intermediate plug 78 which has an upwardly projecting extension 80 adapted to engage the lower end 81 of the liner 44 in fluid-tight engagement. In the upper end of the extension 80 a dashpot cavity 82 is formed, the side wall 83 thereof having ports 84 which connect the lower cylinder space 85 with an annular space 86 formed between the extension 80 and the wall 87 of the power cylinder 41, which space 86 is connected to the chamber 42 at the upper end of the cylinder 41 by means of coaxial passages 88 which are formed between the cylinder 41 and its liner 44.

A piston rod 90 extends downwardly from the power piston 72 through the intermediate plug 78 and a valve structure 91 disposed at the lower end thereof into engagement with the upper end of a pumping piston 92 which is reciprocable in a pumping cylinder 93. The pumping cylinder 93 has the same characteristics as the power cylinder 41 in having an upwardly extending wall 94 forming a cavity 95 adjacent the lower end of the intermediate plug 78 to which it is connected by means of threads 96. The lower end of the cylinder 93 comprises a downwardly extending wall 97 which forms a cavity 98 adjacent the upper end of an extension 100 forming a part of a lower plug 101 to which the wall 97 is connected by means of threads 102. By means of threads 103, a fitting 104 is connected to the lower end of the lower plug 101, this fitting 104 having a downwardly tapering wall 105 at the lower end thereof adapted to engage a conical seat 106 formed in a valve insert member 107 which is supported in a reducing fitting 108 which is connected by means of threads 110 to the lower end of a string of pipe 111 which extends to the top of the well and is of such diameter that the pump structure may be lowered therein into engagement with the seat member 107 as shown in Fig. 3. The lower end of the fitting 108 is threaded at 112 to receive an intake member 113 which forms a gas anchor.

It will be noted that the pilot rod 71, the power piston 72, the piston rod 90, and pumping piston 92 are all equipped with axial passages 114, which passages 114 connect with an axial passage 115 extending through a rod 116 which projects downwardly from the pumping piston 92 through the valve structure 117 contained within the cavity 98, and through the lower plug 101 into a tubular member 118 which extends downwardly from the lower plug 101 and has the lower end thereof closed by means of a wall 119.

Oil from the well, which is to be pumped by the pumping piston 92, passes into the lower end of the pump structure through an opening 120 in the foot fitting 104, upwardly through the space within the fitting 104, as indicated by arrows 121, through coaxial openings 122 formed within the wall of the lower plug 101 into the annular space 123 formed in the cavity 98 around the valve structure 117, and through coaxial passages 124 between the pump cylinder wall 93 and its liner 125, which coaxial passages 124 connect the space 123 with the space 126 in the cavity 95 around the valve structure 91. Each valve structure 91 and 117 includes an annular insert body 127 having three L-shaped passages 128 through which oil may pass from the spaces 123 and 126 and through passages 130 into the upper and lower ends 131 and 132 respectively of pumping cylinder spaces formed within insert bodies 133 which are held against the ends of the liner 125. The inner ends of the passages 128 are normally closed against an outflow of fluid by check valve balls 134 which are urged against the inner ends of the passages 128 by means of spring-pressed rings 135. Also formed in the insert bodies 127 is a plurality of coaxial passages 136. These passages connect the passages 130 with annular spaces 137 formed respectively in the lower and upper ends of the plugs 78 and 101, three being passages 138 in the plugs 78 and 101 connecting the spaces 137 with the exterior of the plugs and consequently with the annular space 140 formed around the pump structure 19 within the piping 111. Accordingly, in the operation of the pump, oil is drawn from the spaces 123 and 126 through the passages 128 into the ends of the pumping cylinder and is forced from the pumping cylinder through the passages 136 and 138 into the space 140 within the piping 111 which carries the discharged oil to the top of the well. The discharge passage 33, Figs. 1 and 5, also connects with the space 140 so that the discharge from the power cylinder combines with the pumped oil in the piping 111 and is conducted to the top of the well.

An important feature of the invention consists in the use of a valve member for controlling the flow of fluid under pressure to the upper and lower ends of the power cylinder, this valve member being moved by fluid pressure from one position to another thereof and being positively held in such positions between the proper times for the movement thereof. The valve member 58 may be reasonably termed a piston valve for the reason that it is moved between the primary and secondary positions thereof shown in Figs. 16 and 1 respectively by pressure of fluid against its ends.

The valve structure is very greatly simplified by use of what may be termed the differential principle. In this valve mechanism, as shown in Figs. 1 and 16, fluid under pressure is delivered downwardly through the tube 21 and passes through a screen or filter member 141 into a pressure space 142 formed within the upper end of the valve body 23. Accordingly, the pressure of this fluid is constantly exerted against the upper end face of the piston valve 58 and tends to move the piston valve downwardly from the secondary or raised position in which it is shown in Fig. 1 to the primary or lowered position in which it is shown in Fig. 16. The major portion 62, Fig. 14, of the piston valve 58 is of larger cross-sectional area than the minor portion 60, and means are provided for intermittently producing in the space 47 below the lower end of the piston valve 58 a fluid pressure sufficient to overcome the pressure of fluid in the pressure space 142, to move the piston valve 58 upwardly. Release of the pressure in the space 47 results in a downward movement of the piston valve 58 under pressure of fluid in the pressure space 142.

For purpose of explanation, let it be assumed that with the piston valve 58 in the raised position shown in Fig. 1, fluid under pressure from the space 142 has been applied through the bore of the piston valve 58, ports 67 of the valve member 58, ports 31 of the valve body 23, passages 32, 76, 88, and 84 into the lower cylinder space 85, and that the power piston 72 has been raised from a lowered position such as shown in Fig. 17 to the raised position in which it is shown in Fig. 1. Accordingly, then, it may be assumed that the pilot rod 71 has just reached its raised position so as to bring passage means 143, comprising a plurality of vertical grooves formed therein, as shown in Figs. 1, 10 and 11, into a position to connect the port 52 leading into the space 47 with the port 55 which communicates with the space 140 exterior of the pump structure 19 through passages 56, 57, 37, and 38. In a pumping mechanism of the character shown, the pressure in the space 140 of the delivery column 111 may be considered a low fluid pressure in view of the fact that it is substantially one-half the pressure of the fluid applied to the space 142. Accordingly, the bringing of the passage means 143 into conjunction with the ports 52 and 55 will result in a decrease of the pressure within the space 47 to a low value, and the high fluid pressure in the space 142 will operate to move the valve member 58 downwardly, discharging low pressure fluid outwardly through the port 52 and the passages 143, etc., which are at this time connected thereto as the result of the pilot rod 71 reaching its raised position as hereinbefore described, the result being, therefore, that the valve member will move downwardly from the raised secondary position shown in Fig. 1, in which it connects the primary passage 30 with discharge through the passage 33 and connects the passage 32 with fluid under pressure through the port 31, to its lowered primary position shown in Fig. 16, in which the primary valve ports 65 will connect the primary passages 30 with fluid under pressure through the ports 28, and the shallow channel 69 will move down into such position as to connect the ports 31 at the upper ends of the passages 32 with the discharge port or passage 33, thereby permitting fluid under pressure to flow into the space or cavity 73 at the upper end of the power cylinder, and fluid from the lower cylinder space 85 to discharge through the passage 32 and the ports 31, 69, and 33 into the space 140.

An especial feature of the invention is to provide a slow travel of the piston valve 58 as it approaches the points in its travel at which pressure fluid is admitted to the opposite ends of the power cylinder and at which oil is admitted to the pump cylinder. It will be noted that the port 52 leading into the space 47 is disposed a short distance above the bottom of the space 47 and that, as best shown in Fig. 14, the lower end of the piston valve 58 has an annular wall 144 internally formed so as to cover the port 52 when the piston valve 58 nears the lower end of its movement, as shown in Fig. 18, thereby shutting off escape of fluid through the port 52 and the passage means 143, etc., which are at this time connected therewith.

The final downward movement of the piston valve 58 is then controlled by a novel form of throttling means which controls the escape of fluid from the space 47 below the piston valve 58. The throttling means includes upper and lower helical grooves 145 and 146 formed in the outer surface of the valve liner 45, the upper groove 145 extending in a helix downward from the upper end surface of the liner and the lower groove 146 extending in a helix upward from an annular channel 147 formed in the outer surface of the liner just above the port 50. Formed in the bore of the major portion 62 of the piston valve 58 is a shallow channel comprising an inlet space 148 extending from the upper edge of the annular wall 144 to a point slightly below the ports 67. A passage 149 is formed through the lower end of the piston valve 58 so as to communicate between the space 148 and the space 47 below the piston valve 58. At the time the wall portion 144 of the piston valve 58 first closes the port 52, the ports 67 of the piston valve 58 will connect with the channel 36 which is in communication through the passage 35 with the discharge fluid in the space 140 exterior of the valve body 23, and fluid from the lower end of the space 47 below the piston valve 58 may flow upwardly through the passage 149, the space 148 and slowly through the throttling means represented by the long spiral groove 146, thence through the ports 67, the channel 36, and the passage 35 to the exterior, thereby permitting the piston valve to move to its extreme lowered position.

When the piston valve 58 reaches its lowered or primary position, as shown in Fig. 16, the power piston 72 will be moved downwardly as the result of the application of fluid under pressure from the space 142 through the primary passage 30 and associated passage and port means, as hereinbefore described. When the power piston 72 reaches the lower end of its downward movement, passage means 150, preferably comprising a plurality of vertical grooves formed near the upper end of the pilot rod 71 will be brought into the position in which they are shown in Fig. 16, connecting the upper part 151 of the bore of the liner 45, which now contains fluid under high pressure, with the channel 48 in the bore of the liner 45, which channel connects through the ports 50 with the space 148 below the helical groove 146. Accordingly, fluid under high pressure is then conducted through the space 148 and the passage 149 into the extreme lower end of the space 47 below the major portion 62 of the piston valve 58. The pressure of the fluid now exerted against the lower end face of the piston valve 58 will be the same as the pressure of fluid exerted against the upper end thereof, but in view of the fact that the area of the lower end of the piston valve 58 is greater than the area of the upper end thereof, the piston valve 58 will be forced to move upwardly from the position in which it is shown in Fig. 16 toward the position in which it is shown in Fig. 1. As the piston valve 58 moves upwardly, the wall 144 at the lower end thereof will cover the port 50, as shown in Fig. 18, so that the fluid under pressure can no longer enter therethrough but at this time the upper end of the space or channel 148 will have reached a position in which it communicates with the upper helical groove 145, and a restricted flow of fluid through the throttling means represented by the helical groove 145 and the space 148 and the passage 149 into the space 47 below the valve 58 will complete the upward movement of the piston valve 58 to its secondary position shown in Fig. 1.

In order to avoid excessively slowing up the operation of the valve during its slow-moving period described above, I prefer to arrange the throttling means of the valve so that the valve moves very slowly during the early part of the admission of oil to the pump cylinder so that hydraulic shock is avoided and then increases in speed during the rest of its travel. One efficient means for accomplishing this function, which I prefer to utilize, comprises helical grooves 145 and 146 which are graduated in depth, the deeper portions of the respective grooves being at the point at which they communicate with the upper end surface of the liner and the annular channel 147, respectively as shown in the drawings. In operation, when the annular wall 144 first covers the port 52 on the downward movement of the valve, the position in which it is shown in Fig. 17, the ports 67 are in communication with the shallower portion of the groove 146, and a very gradual flow of fluid through the passage 149, the space 148, and the groove 146, into the ports 67 occurs, resulting in a very slow movement of the piston valve during the initial opening of the primary passage 30 and during the early part of the admission of oil to the pump cylinder. As the piston valve 58 moves downwardly, the deeper portions of the spiral groove 146 come into communication with the ports 67, allowing freer flow of the fluid therethrough so that the speed of the valve during the rest of its travel increases, the final speed thereof just before it reaches the ends of its stroke being preferably almost as great as its speed at the time the port 52 is initially cut off. I have found that the only time that extremely slow motion of the valve is required to overcome hydraulic shocks, as stated above, is during the first admission of oil. In other words, the important requirement is that the valve should start its slow movement just prior to the admission of oil and that during the period from cut-off to admission the piston stands still, as clearly indicated in the space-time diagram of Fig. 19. Therefore, if the valve continued to move through the rest of its stroke at the rate which is required to prevent shock during the first admission of oil, the time required for this movement would be excessive and the speed of the pump would be restricted. The provision of the throttling grooves 145 and 146, which are graduated in depth, controls the valve to produce slow motion thereof only where required to prevent shock, and therefore, the maximum speed of the pump can be greatly increased. It will be clear that the slow movement of the valve during the early part of the admission of oil and the subsequent increase in speed during the rest of its travel may be controlled as desired by varying the depth of the helical grooves 145 and 146. During the upward movement of the piston valve 58, the space 148 communicates first with the shallower portions of the spiral groove 145, as access of the fluid under pressure to the space 47 through the port 50 is cut off by the wall 144, and then as the valve 58 moves upwardly the space 148 communicates with deeper portions of the groove to allow increased flow of oil therethrough into the passage 149 and the space 47 to accelerate the movement of the valve into its secondary position in which it reaches the upper end of its stroke.

While the throttling means of the invention, above described, is sufficient under normal conditions to prevent shock, I prefer to utilize in conjunction therewith an additional means for modulating control of the delivery of fluid under pressure to the upper and lower ends of the power cylinder. As shown best in Figs. 14 and 15, short channels 153, 154, 155, and 156 are formed respectively in the outer surface of the piston valve 58 so as to connect with ports 65, the upper end of the shallow channel 69, the lower end of the shallow channel 69, and the ports 67, these short channels 153, 154, 155, and 156 varying from minimum to maximum in length, as shown in Fig. 15. The result of this construction is that when the piston valve 58 moves downwardly from the secondary position in which it is shown in Fig. 1 and approaches the primary position in which it is shown in Fig. 16, its movement being slowed, as previously described, by the throttling means, just before the ports 65 reach the ports 28 the first communication of the valve ports 65 with the ports 28 will be through the short channels 153. This causes a slow introduction of fluid into the upper ends of the passages 30 which in addition to the slow movement of the valve controlled by the throttling means effectively reduces hammering or pulsating effect in the structure to a minimum. Likewise, as the lower edge of the shallow channel 69 of the piston valve 58 approaches the ports 31, there will be a slow opening of the upper ends of the passages 32 to discharge pressure through the short channels 155. The short channels 154 and 156 operate in a similar flow modulating manner with respect to the ports 31 and 38 as the piston valve 58 moves into fully raised or secondary position of Fig. 1.

An additional important feature of the mode of operation of the structure described comprising my invention is that the piston valve 58 is preevnted from premature movement from both its primary and secondary positions. This effect is accomplished by an auxiliary control of the fluid pressure against the ends of the piston valve 58, and this purpose is served by the throttling means of the invention represented by the helical grooves 145 and 146, together with the space 148 and the passages 149 associated therewith, as above described. In operation it will be noted that while the pilot rod 71 is traveling downwardly from its raised position and before it has reached the position in which it is shown in Fig. 16, and when the piston valve 58 is in its lower or primary position, the helical groove 146 communicates through the ports 67, the channel 36, the passage 35, with the fluid under low or discharge pressure in the space 140 surrounding the pump structure 19. During this time any leakage of fluid under pressure past the pilot rod 71 cannot exert an upwardly motivating force against the lower end of the piston valve 58 for the reason that such leakage fluid may pass out through the groove 146, the ports 67, the channel 36, and the passage 35 to the space within the discharge column 111. Likewise, during the time the piston valve is in raised position, as shown in Fig. 1, and the pilot rod 71 is traveling upwardly, the space 47 will be open to fluid under pressure through the helical groove 145, the space 148, and the passage 149, the groove 145 being of such capacity that it will supply fluid under pressure to the space 47 faster than fluid can escape from the space through the port 52 and around the pilot rod 71 below the port 52.

Although I have herein shown and described my invention in simple and practical form, it is recognized that certain parts or elements thereof are representative of other parts, elements, or mechanisms which may be used in substantially the same manner to accomplish substantially the same results; therefore, the invention is not to be limited to the details of construction disclosed herein but is to be accorded the full scope of the appended claims.

I claim as my invention:

1. A valve mechanism for a fluid motor of the character described having a piston operable in a cylinder and having a passage for supplying pressure fluid to an end of said cylinder, including: a valve member movable between primary and secondary positions to alternately open said passage at a point intermediate said primary and secondary positions; means for moving said valve between said primary and secondary positions; and means for slowing the movement of said valve at a point at which said passage is initially opened and for accelerating the movement of said valve from said point to said primary and secondary positions.

2. A valve mechanism for a fluid motor of the character described having a piston operable in a cylinder and having primary and secondary passages supplying pressure fluid to opposite ends of said cylinder, including: a valve member movable between primary and secondary positions in axial alignment with said cylinder and arranged to initially open said primary passage before it reaches said primary position and to initially open said secondary passage before it reaches said secondary position; means for moving said valve between said primary and secondary positions; means for slowing the movement of said valve as said primary passage is initially opened and for accelerating said valve during its subsequent movement into said primary position; and means for slowing the movement of said valve as said secondary passage is initially opened and for accelerating said valve during its subsequent movement into said secondary position.

3. A valve mechanism for a fluid motor of the character described having a piston operable in a cylinder and having passages for supplying pressure fluid to opposite ends of said cylinder, including: a valve member adapted to be moved by fluid under pressure to alternately open said passages; means operatively connected to said piston for controlling the application of fluid to move said valve member; and means for slowing the movement of said valve member during the initial opening of said passages thereby and for accelerating the movement of said valve member during the completion of the opening of said passages.

4. A valve mechanism for a fluid motor of the character described having a piston operable in a cylinder and having passages for supplying pressure fluid to opposite ends of said cylinder, including: a valve member adapted to be moved by fluid under pressure to alternately open said passages; means operatively connected to said piston for controlling the application of fluid to move said valve member; and throttling means including walls forming restricted passages controlling the fluid moving said valve member to slow the movement of said valve member during the initial opening of said passages and to accelerate said valve member during the completion of its movement to fully open said passages.

5. A valve mechanism for a fluid motor of the character described having a piston operable in a cylinder, including: a valve casing having walls forming a valve bore disposed in axial alignment with said piston cylinder, said casing having passages for supplying pressure fluid to opposite ends of said piston cylinder; a valve member adapted to be moved in said bore by fluid under pressure to alternately open said passages; means operatively connected to said piston for controlling the application of fluid to move said valve member; and throttling means including walls forming restricted channels in said casing through which said fluid controlling said valve must flow during part of the movement of said valve, said channels being arranged to slow the movement of said valve during the initial opening of said passages and to allow acceleration of said valve during the completion of its movement to fully open said passages.

6. A valve mechanism for a fluid motor of the character described having a piston operable in a cylinder, including: a valve casing having walls forming a valve bore; a pilot rod connected to said piston extending into said bore; a tubular wall in said casing surrounding said pilot rod; a tubular valve member in said bore and having a portion thereof disposed in an annular space defined by said tubular wall and the wall of said bore; walls forming pressure fluid passages in said casing for supplying pressure fluid to opposite ends of said cylinder; means including walls forming a fluid passage in said pilot rod for conducing fluid to and from said annular space for controlling movement of said valve member to alternately open said pressure fluid passages; means carried by said valve for stopping flow through said fluid passages in said pilot rod during part of the movement of said valve; and throttling means including a restricted channel defined by the outer surface of said tubular wall and said valve member through which said fluid controlling said valve must flow when the flow of said fluid in said fluid passages in said pilot rod is stopped, said channel being operable to slow said valve during the initial opening of said passages and to allow acceleration of said valve during the completion of its movement to fully open said passages.

7. A valve mechanism for a fluid motor of the character described having a piston operable in a cylinder, including: a valve casing having walls forming a bore into which a pilot rod connected to said piston extends; a tubular wall in said casing surrounding said pilot rod; a tubular valve member in said bore and having a portion thereof disposed in an annular space defined by said tubular wall and the wall of said bore; walls forming primary and secondary passages in said casing for supplying pressure fluid to opposite ends of said cylinder; means including fluid passage means in said pilot rod for conducting fluid into said annular space for controlling movement of said valve member to alternately open said primary and secondary passages; means carried by said valve for stopping flow of fluid through said fluid passages in said pilot rod just before said primary and secondary passages are opened; and throttling means including walls forming grooves in the outer surface of said tubular wall cooperating with said valve member to define a first restricted channel through which said fluid controlling said valve must flow during opening of said primary passage and defining a second restricted channel through which said fluid must flow during opening of said secondary passage and said channels being graduated in area so that said valve is slowed during the initial opening of said passages and accelerated during the completion of its movement to fully open said pasages.

8. A valve mechanism as specified in claim 7 in which said grooves cooperating with said valve member to form said restricted channels are spiralled.

9. A valve mechanism of the character described, including: walls forming a valve bore; walls forming a pressure fluid passage therein; a valve member adapted to be moved by fluid pressure in said bore to open said passage to supply pressure fluid thereto; walls forming port means supplying fluid for controlling said valve member; means carried by said valve member for closing said port means just before said passage is opened; and throttling means including a spiral groove formed in a wall of said bore through which said fluid controlling said valve must flow when said port means is closed, the cross-sectional area of said groove being graduated and said groove being disposed so that said valve is slowed during the initial opening of said passage and accelerated during the completion of its movement to fully open said pasage.

CLARENCE J. COBERLY.